United States Patent [19]
Carlon et al.

[11] Patent Number: 5,818,566
[45] Date of Patent: Oct. 6, 1998

[54] STRUCTURE FOR RIMLESS SPECTACLES HAVING IMPROVED HINGE, BRIDGE, AND NOSEPIECE STRUCTURES

[75] Inventors: Roberto Carlon; Mirco Carraro, both of Venice, Italy

[73] Assignee: Sinthesys S.r.l., Venice, Italy

[21] Appl. No.: 709,048

[22] Filed: Sep. 6, 1996

[30] Foreign Application Priority Data

Sep. 6, 1995 [IT] Italy ............................ TV95 A 000105
Sep. 26, 1995 [IT] Italy ............................ TV95 A 000113

[51] Int. Cl.⁶ .................................. G02C 1/02; G02C 5/22
[52] U.S. Cl. .......................... 351/110; 351/113; 351/153; 16/228
[58] Field of Search ..................................... 351/110, 106, 351/111, 113, 124, 126, 134, 153; 16/228

[56] References Cited

U.S. PATENT DOCUMENTS

| 5,073,020 | 12/1991 | Lindberg et al. ...................... 351/106 |
| 5,585,870 | 12/1996 | Masunaga ............................... 351/110 |

FOREIGN PATENT DOCUMENTS

| 003928 | 9/1979 | European Pat. Off. . |
| 546589 | 6/1993 | European Pat. Off. . |
| 9417374.5 | 1/1995 | Germany . |
| 181221 | 6/1980 | Italy . |
| 1147198 | 12/1981 | Italy . |
| 2274728 | 8/1994 | United Kingdom . |
| WO95/18985 | 7/1995 | WIPO . |
| WO96/18127 | 6/1996 | WIPO . |

*Primary Examiner*—Huy Mai
*Attorney, Agent, or Firm*—Fay, Sharpe, Beall, Fagan, Minnich & McKee

[57] ABSTRACT

A structure for rimless spectacles of the type fashioned from wire where the shafts are attached on either side to static hinge mounts, likewise in wire, each anchored by two parallel shanks with portions bent outward from the lenses and affording pairs of coils aligned with the points of anchorage; and where the bridge and nosepiece support is in one piece and exhibits an upturned-U profile with splayed members formed into a loop at bottom and redirected upwards, each terminating in a fork of which the pins are inserted obliquely through the relative lens and anchored in an interference fit; alternatively, each upwardly directed end can be bent sideways at 90° to form an angled portion accommodated partly by a groove machined in the lens and terminating in a single pin, again inserted obliquely through the lens; and further where the lens presents a peripheral channel in which to seat elastically deformable ring.

31 Claims, 2 Drawing Sheets

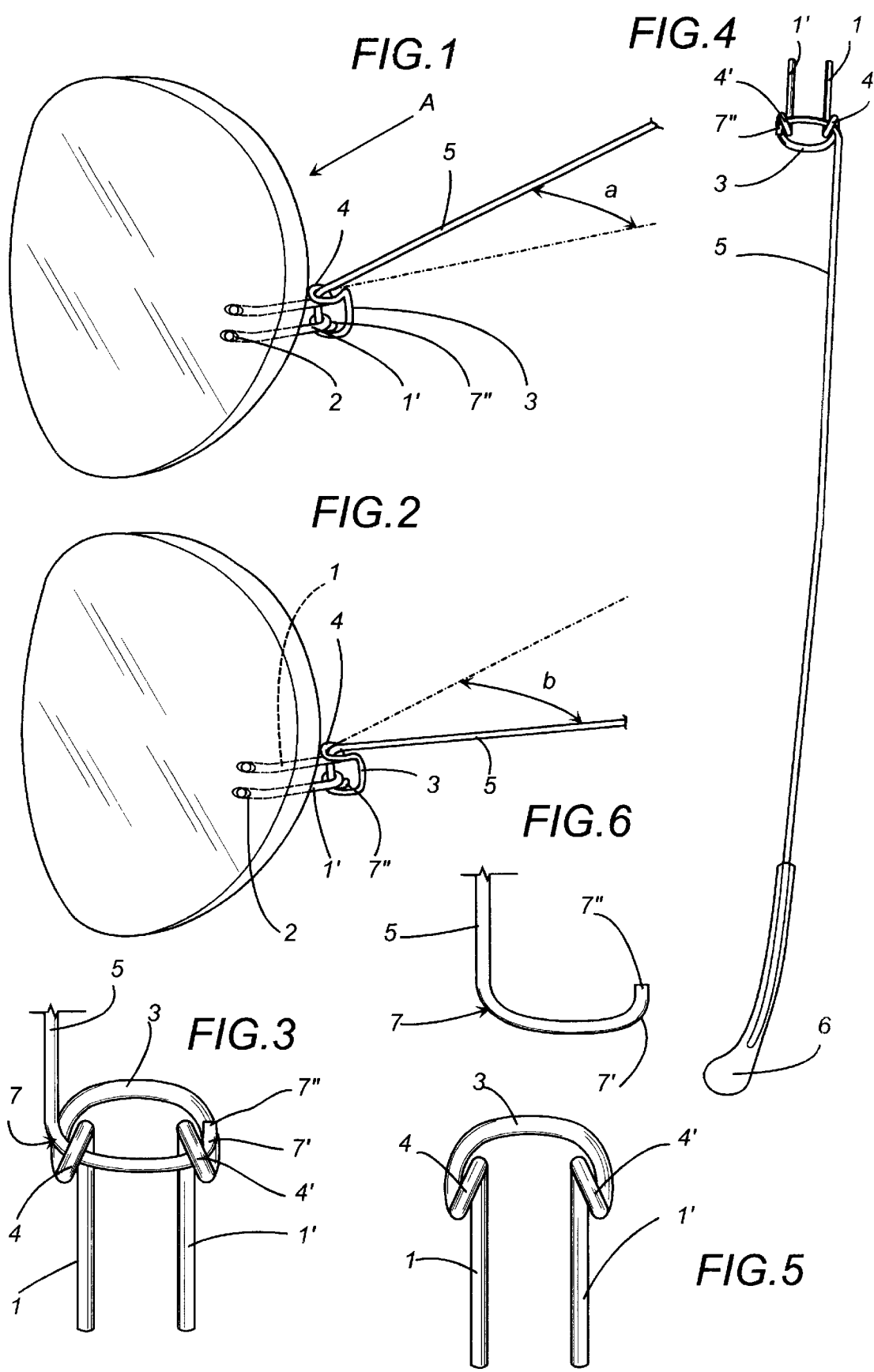

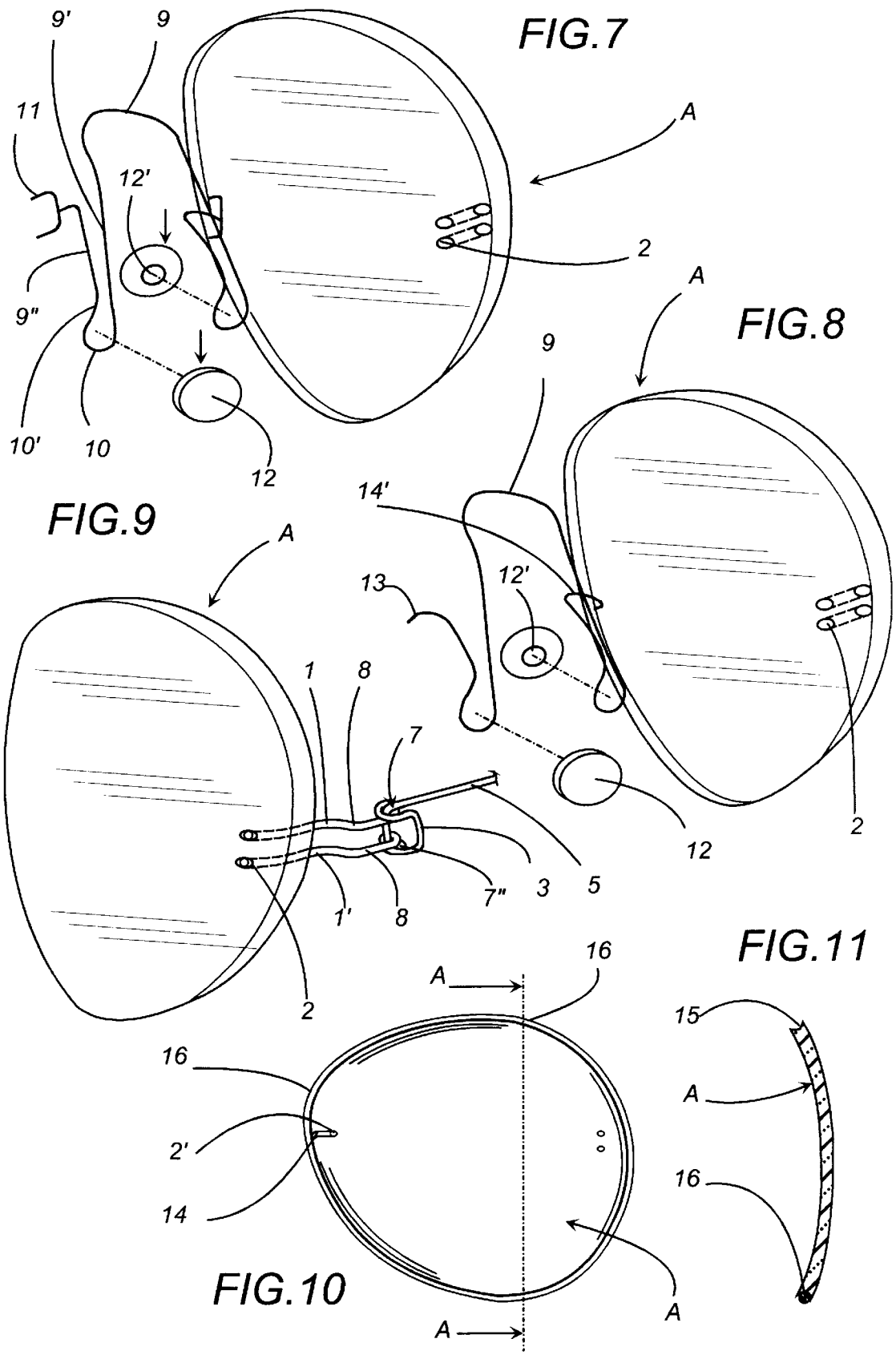

STRUCTURE FOR RIMLESS SPECTACLES HAVING IMPROVED HINGE, BRIDGE, AND NOSEPIECE STRUCTURES

BACKGROUND OF THE INVENTION

The present invention relates to a structure for rimless spectacles of the type fashioned from wire. The invention finds application particularly, though by no means exclusively, in the manufacture and sale of spectacles in unlimited quantities, be it glasses needed to correct eyesight, or sunglasses, or even purely aesthetic eyewear.

The prior art embraces spectacle frames in a multitude of patterns composed principally of a part that serves to support the lenses, consisting in two rims often joined together by a bridge, also nosepieces which in certain instances may be formed integrally with the rims, and finally a pair of shafts. A good many shafts are furnished with devices located close to the hinges by which they are connected to the rims, and designed to allow a flexible association with the remainder of the frames in such a way that the shafts themselves can be spread apart. Incorporated into the structure on both sides, this is a feature that brings ergonomic advantages, not least in allowing a generous measure of adaptability to the dissimilar facial contours of different users; in addition, spectacles are improved in terms of general wearability and at the same time made more readily tolerable to a wider public, given that the pressure of the shafts on the temples will tend to be less.

By way of example, one conventional flexibly mounted shaft currently enjoying widespread popularity is the subject of European Patent application no. 79400087.7, which discloses a spring hinge for spectacle frames composed essentially of a housing, associated with the side of the shaft, and a tie rod disposed internally of and coaxially with the housing. The end of the rod is threaded and carries a screw-coupled bush serving to maintain the position of a spring of which one end locates in a seat afforded by the housing.

Another example representative of the prior art is disclosed in Italian Utility Model No. 181221. This relates to an improved hinge for the articulation of a flexibly mounted shaft with a spectacle frame wherein use is made of an angle bracket embedded in the frame, and, pivotably associated with the bracket, a further angled support that functions as an abutment against which to compress a spring.

A further example of the prior art is illustrated in Italian Patent No. 1 147 198, relating to a flexibly hinged shaft for spectacle frames, wherein the end of the shaft affords a block with an axial hole in which to insert one connecting end of the hinge. This same connecting end exhibits a portion of reduced diameter serving as the mount for a metal tongue that engages in the block; a tensioning coil spring located behind the tongue is secured internally of the block by a lock nut. In this instance the shaft can be opened out flexibly to a given angle as a result of the elastic compliance afforded by the connecting end of the hinge.

The solutions briefly described above betray a common drawback, namely that the devices utilized are notably complex. Whilst indeed eminently capable of performing the intended function, each nonetheless presents a not insignificant number of problems to be overcome where implementation is concerned, as regards the embodiment of the many precision components required on the one hand and their assembly on the other, which ultimately has a considerable impact on the time scales and the costs involved in manufacture.

Accordingly, one of the main objectives taken up by companies operating in the art field in question has been to develop spring hinge devices for the shafts of spectacle frames which while affording a greater measure of compactness would also bring sought-after functional advantages, at the same minimizing the number of component parts, facilitating assembly and cutting costs.

Among the more recent frame patterns to be developed in keeping with the principles outlined above, and marketed with varying degrees of success, there is the solution of EP No. 546 589 (Lindberg) which relates to means of supporting spectacle lenses, in particular of rimless type. Rimless spectacles exhibit one essential characteristic, namely that in place of the familiar spring hinge device, which in any event is complex by reason of its incorporating a great many mechanical components, the end of the shaft is modified in shape and thus simplified, whilst retaining the same elastic compliance in relation to the point of connection with the lens. More exactly, the spectacles in question comprise a pair of lenses without rims, that is to say without a frame element or hoop of the type by which the eyepiece is fully circumscribed. The lenses are joined together by a bridge, fashioned from wire in this instance and bent in such a way as to form loops in which corresponding nosepieces of the frame are retained. Again by virtue of its particular geometry, the wire bridge also affords anchor lugs incorporated into the opposite ends of the length of wire, next to the nosepieces. To secure the bridge in place, oblong holes are pierced in the single lenses such as will accept the extremities of the respective anchor lugs.

The shafts in the solution of EP 546 589 (Lindberg) are fashioned from wire; each is bent downwards at one end so as to pass around part of the outer ear, in conventional manner, and formed at the opposite end into a spiral of which the axis is disposed at right angles to the straight part of the shaft. The spiral portion functions as the female part of the hinge by way of which the shaft is connected to the relative lens of the spectacles. Each lens affords a through hole located on the side opposite from that associated with the bridge and serving to accommodate the second or male part of the shaft hinge, which consists in a length of wire having one end bent and anchored to the lens, whilst the other extends horizontally a short distance before being bent through 90° in such a way as to afford a vertically disposed pin. It is to this pin that the spiral portion of the shaft is fitted, and the shaft thus hinged to the lens. The spreading movement of the shaft is therefore dependent on the spiral, of which the tip becomes constrained by the forcible outward rotation of the shaft to impinge on the horizontal portion presented by the male part of the hinge, causing the spiral itself to function as a spring and oppose the outward movement of the shaft.

The Lindberg solution envisages two methods by which the ends of the shafts and the respective ends of the bridge, hence the nosepieces, can be anchored to the lenses, both of which involve piercing the lens at each anchorage point with a single hole that passes perpendicularly through the full thickness of the lens. The hole presents an essentially oblong shape and is proportioned to accept the terminal part of the relative component (hinge or bridge) together with an adhesive. In the example published, the terminal part in question passes completely through the thickness of the lens and exhibits a substantially U shaped profile with horizontally disposed members.

There are drawbacks discernible in the solution of the Lindberg patent EP 546 589, impacting most importantly on the design of the hinges, which are attributable to the complexity of the operations performed on the wire and in particular the need for the terminal portion of each shaft to be fashioned as a spiral. In addition, the solution disclosed does not reliably guarantee a secure association between the male part of the hinge afforded by the pin and the female part afforded by the spiral, which tend frequently to become unseated. Lastly, the spiral geometry adopted for the terminal portion of the shaft is instrumental in making the shafts themselves excessively compliant, so that the capacity of the spectacles to remain stably positioned on the face of the wearer is reduced.

The object of the present invention is to overcome the drawbacks mentioned above.

SUMMARY OF THE INVENTION

The stated object and others besides are duly realized according to the present invention by the adoption of a structure for rimless spectacles as characterized in the appended claims, of the type fashioned from wire bent in such a manner as to support a pair of lenses; such a structure exhibits a bridge interconnecting the lenses, with corresponding nosepieces secured to the bridge, and, anchored to the sides of the assembled spectacles or rather to the outermost edge of each single lens, a pair of hinge mounts fashioned likewise from wire, presenting two parallel and substantially rectilinear shanks insertable obliquely through the relative lens, with two coiled rings extended from the parallel shanks and interconnected by a curved member; also a pair of shafts, each exhibiting a male end of essentially L-shaped profile insertable through and between the two coils of the hinge mount, of which the predominant portion appears rectilinear, with a bend at one end such as will adapt to the profile of the outer ear, and the hinged end affords a straight portion disposed at right angles to the predominant portion, extending into a short terminal portion bent at 90°, in such a way that when the shaft is rotated outwards, this same terminal portion will interact with a part of the hinge mount.

In the structure disclosed, the bridge and nosepiece support is embodied as a single piece, presenting an essentially upturned-U profile in which each of the two downwardly directed portions is formed into a loop at bottom, closed around some three quarters of a notional circumference and extended thereafter into an upwardly directed portion terminating in a forked tip of which the points are inserted obliquely through the relative lens.

In at least one possible alternative embodiment of the structure disclosed, each upwardly directed portion of the one-piece bridge and nosepiece support exhibits a portion bent away through 90°, which is positioned to interlock in part with an appropriately ground lens and extended thereafter into a further bent portion insertable obliquely through the lens.

Moreover, the shanks of the hinge mount emerging on the concave side of the lens can be modified in shape in such a way as to incorporate an outwardly directed bend; also, the coils of the hinge mount through which the L-shaped end of the shaft is insertable can be substantially aligned with the two parallel shanks anchored to the lens, and finally, the single lenses might be embodied with a groove extending entirely around the periphery, in which to seat an elastically deformable ring or hoop.

The present invention affords a number of advantages. Firstly, the manufacture of rimless glasses can be simplified, bringing significant benefits in terms of time and costs. Secondly, the particular features of the hinge system adopted for the shafts offers good guarantees of strength while allowing an elastically compliant movement of the shaft in one direction that is both progressive and uniform, and finally, ensuring that the spreading action of the shafts will continue to be opposed, over time, by a reasonable reaction force. Given also the particular method of securing both the shaft hinges and the bridge utilizing fork elements inserted through the lens, one has a good guarantee of stability attributable to the fact that with the oblique style of anchorage, the thickness of the lens effectively penetrated can be increased, no adhesives are necessary, and the mechanical tensions inherent in the type of anchorage afforded by prior art teachings are eliminated.

Other advantages of the structure disclosed include a better general fit of the spectacles, and by virtue of the hinge arrangement, a considerable increase in the active surface afforded by the male part of the shaft, ensuring faultless rotation of the shaft and improving the strength of the overall structure still further.

Finally, thanks to particular geometry of the bridge and nosepiece support, the nosepieces themselves are prevented from escaping accidentally and guaranteed to remain permanently associated with the structure.

Further benefits of the invention are discernible in a structure having desirable ergonomic advantages and a not unattractive appearance. For manufacturers, a much improved sales potential translates into significantly reduced production costs, in view of the fact that the solution disclosed is markedly simple and undemanding, wholly dependable and virtually maintenance-free.

BRIEF DESCRIPTION OF THE DRAWINGS

The invention will now be described in detail, by way of example, with the aid of the accompanying drawings, in which:

FIG. 1 illustrates a part of the structure for rimless spectacles according to the present invention, in a perspective view showing one only of the two lenses and, fitted to one side of the lens, an elastically compliant shaft fashioned from wire;

FIG. 2 is again a perspective view of the lens shown in FIG. 1, but illustrated with the shaft constrained to flex further outwards;

FIG. 3 illustrates a detail of the structure, viewed in plan and showing the manner in which the shaft is articulated with a corresponding hinge mount to be anchored to the respective lens of a pair of rimless spectacles;

FIG. 4 illustrates the entire shaft, again in plan, complete with a hinge mount to be anchored to the respective lens;

FIGS. 5 and 6 illustrate the single components of a wire hinge for spectacles with flexibly articulated shafts: a hinge mount and a terminal portion of the shaft, respectively;

FIG. 7 illustrates a part of the structure for rimless spectacles in a perspective view showing one only of the two lenses and, associated with one side of the lens, a bridge interconnecting the lens and supporting the nosepieces which is indicated in a first possible embodiment;

FIG. 8 is again a perspective view of the lens shown in FIG. 7, but illustrating an alternative method of anchoring the bridge and nosepiece support;

FIG. 9 is a perspective view similar to that of FIGS. 1 and 2, illustrating an alternative embodiment of the hinge mount according to the present invention;

FIG. 10 is the elevation of a lens viewed from the concave side, being the side opposite to that viewed in FIG. 8, and fitted around the periphery with an elastically deformable ring;

FIG. 11 is a sectional view of the lens illustrated in FIG. 10, taken on A—A.

DESCRIPTION OF THE PREFERRED EMBODIMENTS

With reference to the drawings, the invention relates to a structure for a pair of spectacles comprising at least one lens, denoted A, of the type provided near the periphery on the side directed toward the wearer's face with means by which the lens itself is supported. Such means are composed essentially of two parts, both fashioned from wire bent through a given number of angles, the one static and associated with the lens, the other dynamic and coinciding in practice with the shaft.

The static first part is obtained by bending a short length of wire essentially into a two-pronged or "U" shape so that the two ends or shanks 1–1' are oriented in the same direction, effectively parallel and spaced apart a short distance from one another in the manner of a fork. At given points between the shanks 1–1' and the interconnecting cross member 3 of the "U", which is marginally curved, the static part incorporates two coils 4–4' each associated with a relative shank 1–1'. Whilst the shanks 1–1' are anchored to the lens A, inserted preferably at a slight angle and converging toward the middle of the lens, the coils 4–4' project beyond the dimensional compass of the lenses, with the relative holes affording points to which the dynamic part, i.e. the shaft, can be hinged. In the example illustrated, the coils 4–4' are directed toward the middle of the spectacles, so that the relative shaft can be hinged on the side less exposed to view. As to the geometry and the resulting position of the paired coils 4–4', a first part preceding the cross member 3 will be disposed for practical purposes in the same plane as the shanks 1–1', or in alignment therewith, whereas the cross member 3 itself tends to converge toward the middle of spectacles.

In another preferred solution, rather than appearing essentially straight, the parallel shanks 1–1' by which the static hinge mount is anchored to the lens A are fashioned with an externally oriented bend 8, in such a way that the coils 4–4' are offset and tend to project further from the spectacles in relation to the extremities anchored in the lens A. Again in a preferred embodiment, use might be made of a distance piece (an anti-friction bushing, in effect) which will be inserted between the two coils 4–4' in such a way as to prevent the natural convergence that would be occasioned by an excessive flexural stress.

As already intimated, both the hinge mount and the bridge 9 are anchored to the lens A by insertion into non-perpendicular holes 2–2' such as will retain the inserted extremities without the aid of adhesives; accordingly, besides being disposed skew, converging toward the middle of the lens, the holes are fashioned in such a manner as to obtain an interference fit, utilizing ISO tolerance H6-P5 for the bores and the inserted wires.

The shaft or dynamic part of the aforementioned means of support exhibits an essentially elongated straight portion 5, such as will span the distance separating the lens A and the outer ear. This same substantially rectilinear portion 5 terminates in a plastic covered portion 6 at one end that can be shaped effectively as required and serves to stabilize the spectacles by hooking around the pinna. The opposite end exhibits an essentially L-shaped profile with a terminal portion that consists in a first bend 7, directed downwards preferably at 90° relative to the straight portion 5, and thereafter a second bend 7' positioned at the end of a vertical and rectilinear member of the terminal portion corresponding to the distance between the two coils 4 and 4' of the static part. The second bend 7', likewise of 90°, serves to fashion a catch 7" from the truncated tip of the terminal portion, which projects a short distance from the vertical member. Given the position of the first bend 7, the rectilinear member is accommodated coaxially by the coils 4–4' in such a way that at least the catch 7" can locate against a part of the static cross member 3. Moreover, if the coils 4–4' are twisted further and thus effectively into alignment with the corresponding shanks 1–1', the first bend 7 of the pivot afforded by the L-shaped terminal portion of the shaft 5 will also be able to locate against the cross member 3.

FIG. 1 illustrates the structure in an at-rest open position "a", assumed typically before the spectacles are put on by the wearer, with no pressure applied as yet to flex the shaft outwards. In this configuration, the catch 7" and possibly part of the first bend 7 will be distanced from or barely in contact with the portion of the static part compassed by the vertically disposed cross member 3. In FIG. 2, by contrast, the same shaft is illustrated in a position denoted "b", subject now to a measure of pressure and caused thus to flex beyond the at-rest or normal position.

In this instance the catch 7" and possibly a part of the first bend 7 will impinge more firmly on the static cross member 3, to the point of inducing a slight bending movement in opposition to the action generated through the shaft 5.

Novelty is also displayed in the bridge connecting the two lenses A, right and left, which serves at the same time as a support for the two respective nosepieces.

In the example of FIG. 7, the bridge 9 is composed of three elements. A first element is the bridge proper, embodied in one piece and exhibiting a typical profile essentially of upturned "U" appearance proportioned to straddle the nose, of which the downwardly directed ends 9' flanking the nasal bones are extended on each side into an upwardly directed portion 9", fashioned from the selfsame length of wire. Given the complete reversal in direction, the resulting bent portions can be formed into loops 10, each appearing as an initial bend of 90° or thereabouts which is extended around into a narrowed portion 10' such that the two lengths of wire 9' and 9" are brought almost together before spreading apart finally. The function of the loops 10 therefore is both to support and to prevent the escape of the nosepieces 12, which are fashioned with a soft bearing surface on the one side, a stud 12' on the other, and a portion of reduced diameter in between. The nosepieces 12 are thus insertable from the top of the of wire 9' and 9", and forced downwards to the point of seating stably in the loops 10. The end of each upwardly directed portion 9" terminates in a further right angle bend directed toward the inside of the lens A and affording support perpendicularly to a fork 11, soldered vertically in the particular example illustrated, of which the ends are insertable into respective holes 2' passing through the lens obliquely as mentioned previously. FIG. 8 shows an alternative embodiment of the bridge 9 in which the same one-piece structure is retained, but with the forks 11 replaced by simple bent extremities 13 inserted obliquely into the respective lenses A. In this instance, the lens A affords an anchorage consisting in a single hole 2', and, immediately alongside, a groove 14 extending from the hole 2' to the edge of the lens A. The groove 14 serves to accommodate a bent portion 14' adjoining the extremity 13 inserted through the lens A, preferably together with a small quantity of adhesive to ensure its retention. In another alternative embodiment, finally, the lens A of the spectacles could be of the type illustrated in FIG. 10 affording an annular recess 15, indicated in the corresponding section of FIG. 11 as a peripheral channel of U profile in which to seat an elastically deformable ring 16 fashioned preferably of rubber or other colored material and exhibiting a round cross section.

What is claimed:

1. A structure for rimless spectacles, fashioned from wire bent to support a pair of lenses, comprising:
   a bridge (9) interconnecting the lenses (A);
   a pair of nosepieces (12) secured to the bridge (9);
   a pair of shafts (5), each comprising one substantially L-shaped male end (7);
   a pair of static hinge mounts anchored respectively to an outer edge region of the lenses (A) generally opposite the bridge, each of said hinge mounts including:
   two parallel and substantially rectilinear shanks (1,1') insertable at an oblique angle respectively into two non-perpendicular holes (2) formed in the respective lens (A), the shanks (1,1') of each static hinge mount emerging on a rearwardly facing concave side of the lens (A) and including an outwardly directed offsetting bend (8), and,
   two coiled rings (4,4') interconnected by a curved cross member (3), so that the L-shaped male ends (7,7') of the shafts can be inserted through the two coiled rings (4,4') of the hinge mounts, respectively, said outwardly offsetting bend (8) offsetting said two coiled rings (4,4') of each static hinge mount generally outwardly away from said bridge.

2. A structure for rimless spectacles as in claim 1, wherein each static hinge mount comprises a short length of wire bent into an essentially U profile so that the two shanks are oriented in the same direction, effectively parallel and spaced apart a short distance from one another in the manner of a fork, and the two coiled rings of each hinge mount are located respectively between a terminal end of each shank and the curved interconnecting cross member of the U profile.

3. A structure for rimless spectacles as in claim 2 wherein the shanks of each static hinge mount are anchored to the respective lens by insertion into respective small bore holes angled marginally in a direction convergent with the nosepieces.

4. A structure for rimless spectacles as in claim 2 wherein the coiled rings of each static hinge mount are directed inwardly relative to the structure toward the bridge, in such a way that the corresponding shaft can be hinged on an inward side of each static hinge mount less exposed to view.

5. A structure for rimless spectacles as in claim 2 wherein the curved cross member of each static hinge mount is directed inwardly toward the bridge.

6. A structure for rimless spectacles as in claim 2 wherein each of the shafts comprises a substantially elongated rectilinear portion to span a distance separating the lens from an ear of the wearer, one end of the rectilinear portion terminating in a plastic covered portion shaped to secure the spectacles by hooking over the ear, and the opposite end including a terminal portion of essentially L-shaped profile.

7. A structure for rimless spectacles as in claim 1 wherein the shanks of each static hinge mount are anchored to the lens by insertion into respective small bore holes angled marginally in a direction convergent with the nosepieces.

8. A structure for rimless spectacles as in claim 7 wherein the coiled rings of each static hinge mount are directed inwardly relative to the structure toward the bridge, in such a way that the corresponding shaft can be hinged on an inward side of each static hinge mount less exposed to view.

9. A structure for rimless spectacles as in claim 7 wherein the curved cross member of each static hinge mount is directed inwardly toward the bridge.

10. A structure for rimless spectacles as in claim 7 wherein each of the shafts comprises a substantially elongated rectilinear portion to span a distance separating the lens from an ear of the wearer, one end of the rectilinear portion terminating in a plastic covered portion shaped a to secure the spectacles by hooking over the ear, and the opposite end including a terminal portion of essentially L-shaped profile.

11. A structure for rimless spectacles as in claim 1 wherein the coiled rings of the static hinge mount are directed inwardly relative to the structure generally toward the bridge, in such a way that the corresponding shaft can be hinged on an inward side of each static hinge mount less exposed to view.

12. A structure for rimless spectacles as in claim 11 wherein the curved cross member of each static hinge mount is directed inwardly toward the bridge.

13. A structure for rimless spectacles as in claim 11 wherein each of the shafts comprises a substantially elongated rectilinear portion to span a distance separating the lens from an ear of the wearer, one end of the rectilinear portion terminating in a plastic covered portion shaped to secure the spectacles by hooking over the ear, and the opposite end includes a terminal portion of essentially L-shaped profile.

14. A structure for rimless spectacles as in claim 1 wherein the curved cross member of the static hinge mount is directed inwardly generally toward the bridge.

15. A structure for rimless spectacles as in claim 14 wherein each of the shafts comprises a substantially elongated rectilinear portion to span a distance separating the lens from an ear of the wearer, one end of the rectilinear portion terminating in a plastic covered portion shaped to secure the spectacles by hooking over the ear, and the opposite end including a terminal portion of essentially L-shaped profile.

16. A structure for rimless spectacles as in claim 1 wherein each of the shafts includes a substantially elongated rectilinear portion to span a distance separating the lens from an ear, of the wearer, one end of said rectilinear portion terminating in a plastic covered portion shaped to secure the spectacles by hooking over the ear, and the opposite end including a terminal portion of essentially L-shaped profile.

17. A structure for rimless spectacles as in claim 16 wherein the L-shaped terminal portion of the shaft comprises a first bend, directed downwards with respect to the rectilinear portion to form a second bend located at the end of a rectilinear vertical portion corresponding substantially in length to the distance between the two coiled rings of the static hinge mount, and a second bend located at a terminal end of the rectilinear vertical portion.

18. A structure for rimless spectacles as in claim 17 wherein the first and second bends describe an angle of approximately 90°, said second bend defining a catch at the terminal end of the rectilinear vertical portion projecting a short distance from the rectilinear vertical portion.

19. A structure for rimless spectacles as in claim 18 wherein the first bend of the terminal portion of the shaft occupies a position such that the rectilinear vertical portion is accommodated coaxially by the coiled rings and at least the catch can locate against a part of the curved cross member of the static hinge mount.

20. A structure for rimless spectacles as in claim 17 wherein the first bend of the terminal portion of the shaft occupies a position such that the rectilinear vertical portion is accommodated coaxially by, the coiled rings and at least the catch can locate against a part of the curved cross member of the static hinge mount.

21. A structure for rimless spectacles, fashioned from wire bent to support a pair of lenses (A), comprising:

a bridge (9) interconnecting the lenses (A);

a pair of nosepieces (12) secured to the bridge (9);

a pair of shafts (5) each comprising one male end substantially of "L" shape; and, a pair of static hinge mounts anchored respectively to an outer edge region of each single lens (A) generally opposite the bridge, each including two parallel and substantially rectilinear shanks (1,1') insertable at an oblique angle into two non-perpendicular holes (2') through the respective lens (A), and two coiled rings (4,4') interconnected by a curved cross member (3), so that the L-shaped male end (7,7') of the corresponding shaft (5) can be inserted through the two rings (4,4'), wherein:

the bridge (9) interconnecting the lenses (A) and supporting the nosepieces (12) is fashioned in one piece, presenting an essentially upturned-U profile of which the two downwardly directed portions (9') are formed each into a loop (10) at bottom, closed around some three quarters of a notional circumference and extended thereafter into an upwardly directed portion (9") terminating in a forked tip (11) with points of the forked tip inserted at an oblique angle through the respective lens (A);

the shanks (1,1') of the static hinge mount emerging on the concave side of the lens (A) comprise an outwardly directed bend (8) to offset the coiled rings outwardly away from the bridge; and, the coiled rings (4,4') of the hinge mounts respectively accommodating the L-shaped ends of the shafts are disposed substantially in alignment with the parallel shanks (1,1') anchored to the lens (A).

22. A structure for rimless spectacles as in claim 21 wherein:

the shanks of each static hinge mount are anchored respectively in the two non-perpendicular holes of each lens with an interference fit; and the points of each forked tip portion of the bridge are anchored into their respective lenses by insertion of the points into skew holes formed in each lens and angled in relation to a central portion of the lens, the points of each of said forked tip portions secured in said skew holes, respectively, with an interference fit.

23. A structure for rimless spectacles as in claim 22 wherein each hinge mount further comprises a distance piece including an antifriction bushing interposed between the two rings.

24. A structure for rimless spectacles as in claim 21 wherein each hinge mount further comprises a distance piece including an anti-friction bushing interposed between the two rings.

25. A structure for rimless spectacles as in claim 21 wherein the bridge is essentially of upturned-U appearance designed to straddle nasal bones of a wearer of said spectacles, wherein the downwardly directed portions of the bridge are extended on each side into an upwardly directed portion fashioned from the one length of wire, occasioning a complete reversal in direction and generating respective loops, each appearing as a bend of approximately 90° which is extended around into a narrowed portion such that the two upwardly and downwardly directed portions of wire are drawn almost together before ultimately spreading apart.

26. A structure for rimless spectacles as in claim 21 wherein the two loops formed by the downwardly and upwardly directed portions of the bridge support nosepieces, respectively, each of said nosepieces affording a bearing surface on one side, a stud on the opposite side and an intermediate portion of reduced diameter, said nosepieces insertable from the top of the bridge, locating the reduced diameter portion between the two portions of wire, and forced downwards to the point of seating in the respective loops, respectively.

27. A structure for rimless spectacles as in claim 21 wherein the end of each upwardly directed portion terminates in a further bend of 90° directed toward the middle of the respective lens and affording support perpendicularly to a vertically soldered fork, the ends of said fork being insertable into respective holes passing at an oblique angle through the lens.

28. A structure for rimless spectacles as in claim 21 wherein each of the upwardly directed portions of the bridge includes a portion bent away at an angle of 90°, positioned to be received partially in a groove formed in each lens, respectively, and extended thereafter into a further bent extremity insertable at an oblique angle into a hole formed in the lens.

29. A structure for rimless spectacles as in claim 20 wherein each lens provides an anchorage for the bridge consisting in a single hole and a groove extending from the hole to an edge of the lens, the groove accommodating a bent portion of the bridge adjoining the bent extremity inserted into the lens, together with a small quantity of adhesive.

30. A structure for rimless spectacles as in claim 21 wherein the lens comprises an annular recess formed in a peripheral surface and appearing in cross section as a peripheral channel of U profile in which to seat an elastically deformable ring of round cross section.

31. A structure for rimless spectacles, fashioned from wire bent to support a pair of lenses (A) comprising:

a bridge (9) interconnecting the lenses (A);

a pair of nosepieces (12) secured to the bridge (9);

a pair of shafts (5) each including one male end substantially of "L" shape;

a pair of static hinge mounts anchored respectively to outer regions of the lenses (A) generally opposite the bridge (9), each of the static hinge mounts comprising two parallel and substantially rectilinear shanks (1,1') insertable at an angle through the respective lens (A), and two coiled rings (4,4') interconnected by a curved cross member (3) so that the L-shaped male end (7,7') of each shaft (5) can be inserted through the two rings (4,4') of the hinge mounts, respectively, wherein:

the bridge (9) interconnecting the lenses (A) and supporting the nosepieces (12) is fashioned in one piece, presenting an essentially upturned U-profile of which the two downwardly directed portions (9') are formed each into a loop (10) at bottom, closed around some three quarters of a notional circumference and extended thereafter into an upwardly directed portion (9") terminating in an extremity (13) being inserted obliquely through the relative lens (A);

the shanks (1,1') of the static hinge mount emerge on the concave side of the lens (A) and include an outwardly directed bend (8) to outwardly offset the coiled rings (4,4') away from the bridge;

the coiled rings (4,4') of the hinge mount accommodating the L-shaped end of the shaft are disposed substantially in alignment with the parallel shanks (1,1') anchored to the lens (A).

* * * * *